(12) United States Patent
Ganoung

(10) Patent No.: US 6,612,285 B2
(45) Date of Patent: Sep. 2, 2003

(54) BARREL STRATIFIED COMBUSTION

(76) Inventor: David P. Ganoung, 28002 ½ Candelaria, NW., Albuquerque, NM (US) 87107-2915

( * ) Notice: Subject to any disclaimer, the term of this patent is extended or adjusted under 35 U.S.C. 154(b) by 105 days.

(21) Appl. No.: 10/008,412

(22) Filed: Oct. 24, 2001

(65) Prior Publication Data

US 2002/0069852 A1 Jun. 13, 2002

Related U.S. Application Data

(60) Provisional application No. 60/243,615, filed on Oct. 26, 2000.

(51) Int. Cl.$^7$ ............................................. F02B 31/00
(52) U.S. Cl. ...................................... 123/308; 123/432
(58) Field of Search ............................. 123/308, 432, 123/184.45, 585, 586, 445, 472

(56) References Cited

U.S. PATENT DOCUMENTS

| | | | | |
|---|---|---|---|---|
| 4,726,343 A | * | 2/1988 | Kruger | 123/432 |
| 5,237,973 A | * | 8/1993 | Oda | 123/432 |
| 5,273,014 A | * | 12/1993 | Mitobe et al. | 123/336 |
| 5,291,865 A | * | 3/1994 | Sasaki | 123/298 |
| 5,295,464 A | * | 3/1994 | Ando et al. | 123/308 |
| 5,553,580 A | * | 9/1996 | Ganoung | 123/308 |
| 5,592,916 A | * | 1/1997 | Stockhausen et al. | 123/308 |
| 5,640,941 A | * | 6/1997 | Hazen et al. | 123/306 |

* cited by examiner

Primary Examiner—Mahmoud Gimie

(57) ABSTRACT

A representative version of a combustion system for spark-ignition engines adapts the classic four-valve pentroof combustion chamber to stratified charge operation by (1) restricting fuel delivery to one of the two intake passages serving each combustion chamber and (2) initiating combustion at an offset spark plug location with a sufficient lead in spark timing for fueled mixture to be pushed into the vicinity of a central spark plug before it is fired according to a second spark timing schedule with less advance. In a wide range of higher BMEP which makes a transition to homogeneous charge operation, central fuel metering components become active and the engine throttle stays at least effectively wide open.

19 Claims, 4 Drawing Sheets

FIG. 2 (CONSTANT RPM)

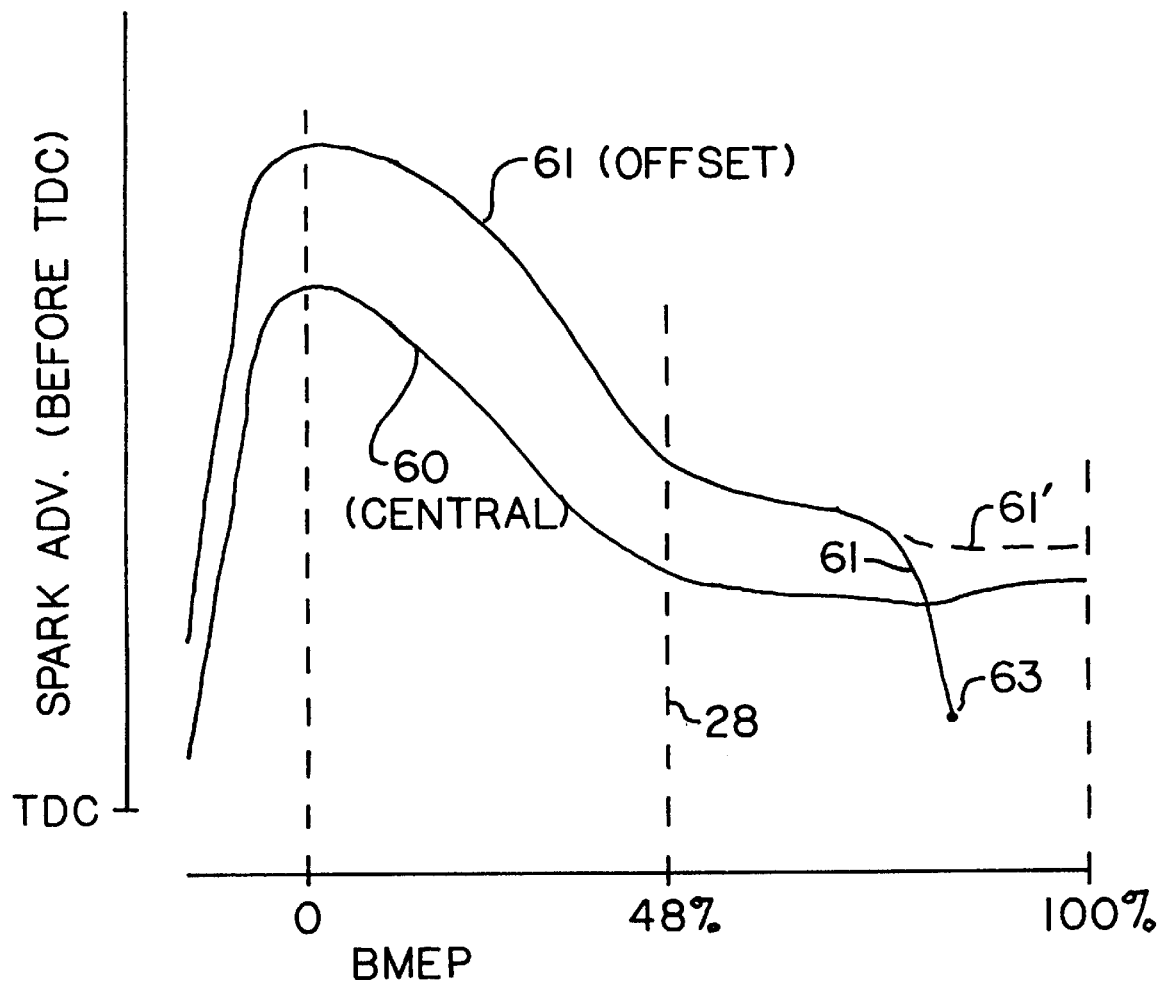
FIG. 4 (CONSTANT RPM)

BARREL STRATIFIED COMBUSTION

CROSS REFERENCE TO RELATED APPLICATIONS

The present application claims the benefit of the Oct. 26, 2000 filing date of U.S. Provisional Patent Application No. 60/243,615, entitled "Stratified Charge Engines and Method for Their Operation."

BACKGROUND OF THE INVENTION

This invention relates to four-stroke spark-ignition engines in which internal combustion of a barrel stratified charge improves fuel efficiency.

Prior to about 1985, most passenger car engines employed one or another combustion chamber configuration with only one intake valve per cylinder. Pentroof chamber configurations with two poppet valves for inducting the engine combustion air (and most often the fuel also) into each engine cylinder have now largely superseded the combustion chamber designs with only a single intake valve. Although the classic four-valve pentroof chamber was incorporated in car racing engines as early as 1912, the unusual placement of the valves in Bristol radial aircraft engines suggests that early designers may not have been very cognizant of the motion of the bulk of the air-fuel charge filling the cylinder at the end of the intake stroke. The combustion chamber configuration of these radial engines (in separate models named Jupiter, Mercury and Pegasus) placed the two intake valves directly opposite each other on facing sides of the pentroof.

In more detail of bulk charge motion, the usual placement of both intake valves on the same side of the pentroof can be combined with appropriate design of the intake passages leading up to these two valves to thus generate a strong swirling motion about an axis perpendicular to the geometric axis of the cylinder. In a longitudinally mounted aircraft engine like the vee-twelve engines widely used in the second World War, this swirl axis parallels the axis about which the aircraft would execute a barrel roll. Barrel swirl is in fact one of the names used to describe the swirl inherent to the classic four-valve pentroof combustion chamber, but tumble is the more commonly used name (unless the engine in question is a barrel stratified charge engine). Even though it is relatively uncommon design practice, barrel swirl can be induced in single intake valve combustion chambers, as demonstrated by Laszlo Hideg in some of the combustion systems disclosed in his U.S. Pat. No. 3,318,292.

This Hideg '292 patent does include perhaps the earliest disclosure of one type of charge stratification that can easily be induced in a reciprocating engine characterized by barrel swirl. Nevertheless, distinctly segregated barrel swirl layers of fueled and unfueled mixture can more conveniently be generated simply by utilizing two intake valves per engine cylinder so that fuel can be metered into the combustion air inducted through only one of the two intake valves. Just such an arrangement for generating two-layer barrel stratification is disclosed by Mitsubishi engineers Ishida et al. in U.S. Pat. No. 5,050,557. In their U.S. Pat. No. 4,494,504, Honda engineers Yagi et al. also disclose the two-layer type of barrel stratification, including a three-valve combustion chamber of the basic type later employed by Mitsubishi in their first mass produced barrel stratified charge engine as described in SAE paper 920670. Since this particular approach positions the single spark plug in a location generally opposite the one of the intake valves which inducts fueled intake mixture, the single exhaust valve is at least moderately offset from a diametral line of symmetry and thus is doubly compromised in comparison to the flow capacity afforded by the twin exhaust valves of the classic four-valve configuration.

In FIGS. 11B and 12A of Ishida '557, the Mitsubishi inventors implicitly acknowledge that the original, centrally located spark plug is by itself insufficient when the classic pentroof combustion chamber, with its twin exhaust as well as twin intake valves, functions in a barrel stratified charge operating mode via restriction of fuel delivery to an intake passage serving just one of the two intake valves. This conclusion seems obvious in view of the fact that the central spark plug will lie on the original plane of symmetry, which now theoretically separates the fueled and unfueled barrel swirl layers. As a result, these FIGS. 11B and 12A of Ishida '557 show an additional spark plug offset nearly all the way to the cylinder wall on the side of the combustion chamber which is fueled during barrel stratified engine operation.

FIG. 12A of Ishida '557 additionally shows a separate fuel injector located in each of the two intake passages serving the four-valve combustion chamber. This configuration with independent fueling of the two intake passages, augmented by central plus offset ignition, in reality composes the basic structural arrangement for a combustion system according to the present invention. However, FIGS. 12B and 12C of Ishida '557 proceed with the Mitsubishi inventors' control strategy and thus verify that their disclosure teaches away from the present invention with its staggered spark timing schedules.

More specifically, FIG. 128 of Ishida '557 clearly reveals the central spark plug as being inoperative whenever just the one of the two barrel swirl layers enveloping the electrodes of the offset spark plug is fueled. The offset spark plug will provide consistent and reliable ignition at this time, but the much faster burning rate for the ten to ninety percent mass fraction as achieved with central ignition is of course sacrificed. FIG. 12C confirms that only the central spark plug is to be fired when both fuel injectors are activated for nominally homogeneous charge engine operation, to thereby effectively duplicate performance long available from the classic four-valve combustion chamber.

Nevertheless, the full extent to which Ishida '557 teaches away from the present invention does not become apparent until its drawing FIGS. 13A, 13B, 13C and 14 are considered. These drawing Figures show, first, that engine operation in the barrel stratified charge mode is not altered when the central spark plug is moved to an offset location symmetric to that of the original offset plug. This is true because the second spark plug, now being completely within the unfueled barrel swirl layer, still is not fired during stratified charge engine operation. Therefore, this change in spark plug location does nothing to remedy the slow burn rate experienced in the stratified charge mode. During high BMEP (brake mean effective pressure) engine operation, however, both spark plugs simultaneously ignite the the air-fuel charge which is nominally a homogeneous charge due to the activation of the individual fuel injectors in both intake passages serving the combustion chamber. In discussion specifically of their drawing FIG. 14, Ishida et al. argue that the two offset spark plug locations provide better engine performance in homogeneous charge mode than does the central-plus-offset placement of the two plug locations. This discussion includes neither the possibility of utilizing earlier ignition at the offset location in order to create more favorable conditions for ignition at the central location during stratified charge engine operation, nor the possibility of using the offset spark plug to also improve engine performance during higher BMEP engine operating conditions bordering on homogeneous charge operation.

In U.S. Pat. No. 5,379,743, Ricardo engineers Stokes et al. disclose their own version of what is in effect a barrel stratified combustion system derived from the classic four-valve pentroof combustion chamber by (1) restricting fuel delivery to the combustion air inducted through only one of the two intake valves and (2) augmenting the original centrally located spark plug with another spark plug offset nearly to the cylinder wall on the fueled side of the combustion chamber. Here again, the engineers specify that one or the other, but not both, of the two spark plugs in each combustion chamber be activated in order to accommodate various engine operating conditions. This stipulation may have added significance in the case of the Ricardo engineers because rather extensive development work was based on the Stokes '743 combustion system, as described in SAE papers 940482 and 950165. Unlike both the present invention and Ishida '557, Ricardo Consulting Engineers dispensed with the fuel metering system capability for enhancing engine operation at high BMEP levels by delivering fuel to combustion air flowing through both intake valves. Consequently, they were forced to improve air utilization at high BMEP by intentionally degrading separation of the two barrel swirl layers via a short and long combination of intake passage lengths.

As yet another example of modification of the classic four-valve pentroof combustion chamber to render a barrel stratified combustion system, Suzuki engineer Hideharu Oda discloses in U.S. Pat. No. 5,237,973 a completely symmetric combustion chamber configuration featuring two offset spark plugs and independent fueling of air inducted through the two intake valves. Although Ishida '557 compares an embodiment with these main features to an otherwise identical embodiment with one central and one offset spark plug, as discussed earlier, Oda '973 does not even mention the central spark plug location.

Returning now to the barrel-stratified combustion systems that have actually reached mass production, Mitsubishi was apparently less than satisfied with their three-valve combustion chamber configuration. Already noted as disadvantages of this configuration are the limited flow capacity of the single exhaust valve and the slow burn rate which results from the single, offset spark plug location. In U.S. Pat. No. 5,295,464, Mitsubishi engineers Ando et al. do specifically mention the restricted flow capacity of the single exhaust valve before embarking on a disclosure of their adaptation of the classic four-valve pentroof combustion chamber for use in a second barrel-stratified passenger car engine that was mass produced. This adaptation abandons two-layer stratification in favor of a central, fueled barrel-swirl layer flanked on each side by an unfueled barrel-swirl layer. Such three-layer barrel stratification of course matches the central spark plug location of the classic four-valve pentroof chamber.

As disclosed in Ando '464, Mitsubishi's production four-valve combustion chamber achieves three-layer barrel stratification by using a partition upstream of the valve stem to divide each of the two intake passages into an air flow portion located on the inboard side of the valve stem and another air flow portion on the outboard side. Fuel is injected into the combustion air flowing through the adjacent, inboard air flow portions of each engine cylinder in an upstream location where these two inboard air flow portions are siamesed but still separate from the outboard portions. Fuel is never injected into air flowing through the outboard air flow portions. As an alternative way of realizing this three-layer type of barrel stratification, Mitsubishi's U.S. Pat. No. 5,237,974 describes a five-valve pentroof combustion chamber in which the combustion air flowing through only the center one of three intake passages is fueled so that the flanking intake passages and their associated intake valves deliver only air. The shortcoming of three-layer barrel stratification is not, however, even mentioned in either of Mitsubishi's '464 and '974 patents, but rather in their SAE paper number 940986.

FIG. 14(b) of this SAE paper shows the two symmetric vortices into which the entire bulk flow of barrel swirl layers is divided as a flat-top piston advances toward its TDC position in a pentroof chamber. By the time the piston has reached a position 15 degrees before TDC, these two vortices have entirely separate swirl rotation axes nearly parallel to the geometric axis of the cylinder itself. In other words, the height of the cylinder volume has been reduced so much by 15 degrees before TDC that the original bulk cylinder flow has been completely broken apart into two symmetric portions each of which has its swirl axis displaced through an angle of almost 90 degrees from the original axis of barrel swirl to thus be almost parallel to the cylinder axis; like conventional axial swirl, these two vortices can survive a large amount of compression by the piston. Most importantly, each of these two vortices now has very strong velocity components traversing the original stratification boundaries of the three-layer type of barrel stratification, but not traversing the single stratification boundary of the two-layer type because the two-layer boundary coincides with the boundary of flow symmetry governing the compression stroke as well as the intake stroke. As a result, two-layer stratification is preserved until quite late in the compression stroke, but three-layer stratification is often degraded quite severely before flame propagation is initiated. While the Mitsubishi engineers say that their three-layer type of barrel stratification is sufficiently preserved at its representative spark timing of 45 degrees before TDC, they also admit that the corresponding piston position for initiation of flame propagation is 15 degrees before TDC. The strong mixing of the fueled and unfueled barrel swirl layers which will likely occur by this time in turn implies that slow combustion will characterize this approach, thus largely nullifying the potential advantage of the central spark plug location in comparison to the offset location of Mitsubishi's earlier two-layer stratified engine. The overall benefit to three-layer barrel stratification as afforded by Mitsubishi's "tumble control piston" can be debated, but a representative spark timing advance of 45 degrees certainly suggests slow combustion.

In summary of the technical literature as outlined above, the basic concept of barrel stratification has yet to be tested in the sense that it has always been saddled with at least one serious compromise or another. Stated from a positive perspective, a combustion system representing the true potential of barrel stratification would incorporate the basic elements of (1) the two-layer type of barrel stratification with features which promote and preserve the stratification, (2) independent control of the air-fuel ratio in the barrel swirl layer which is unfueled during fully stratified charge engine operation and (3) a representative crankangle duration on the order of twenty degrees or even less for the ten to ninety percent mass burned fraction during fully stratified engine operation.

The second one of the three basic elements just enumerated in effect requires a fuel metering system which can implement engine operation in a homogeneous charge mode as well as a barrel stratified mode. In his U.S. Pat. No 4,726,343, Herrmann Kruger discloses an engine which utilizes a combustion chamber with two intake valves and a port type of fuel injector in the smaller one of two intake passages serving each cylinder. A single additional fuel injector delivers fuel to the air inducted through all of the larger intake passages because this central type of injector is located in a separate plenum which serves only the larger intake passages; each of the two plenums has its own throttle valve. If Kruger's engine had a spark plug location appropriate for barrel stratified operation, it could indeed operate in such a mode by maintaining the central fuel injector in a dormant state while appropriately coordinating the positions of the two throttle valves to maintain the same absolute pressure in both plenums. Nevertheless, the central fuel injector could never deliver fuel to combustion air in the other plenum, thus limiting the charge cooling effect of that injector. Furthermore, Kruger '343 discloses that the central fuel injector is to be dormant only when its associated throttle valve is closed, thus precluding barrel stratified engine operation.

SUMMARY OF THE INVENTION

In light of the prior art related to internal combustion engines, it is a primary objective of the present invention to provide a barrel stratified charge engine uncompromised by serious operational defects.

It is another objective to provide at least moderately fast combustion of the ten to ninety percent mass fraction in a two-layer barrel stratified combustion chamber containing a stoichiometrically fueled barrel swirl layer and an unfueled barrel swirl layer.

It is another objective of the present invention to adapt the classic four-valve combustion chamber for barrel stratified engine operation while retaining both consistent ignition at a centrally located spark plug and rapid flame propagation through a barrel swirl layer substantially undiluted by mixing with an unfueled barrel swirl layer.

It is yet another objective to employ combustion of a premixed stratified charge to improve the fuel efficiency of a spark ignition engine, but without the complexity of a divided combustion chamber.

It is still another objective to present a highly efficient spark-ignition engine which burns vaporized fuel rather than the fuel droplets of a fuel aerosol generated by injection of the fuel directly into the combustion chamber.

It is further an objective to present a barrel stratified combustion system which accommodates a wide BMEP range of unthrottled engine operation.

It is another objective of the present invention to present a barrel stratified engine which combines the advantages of port fuel injection at low to medium BMEP levels with the full charge cooling benefit of central fuel injection at maximum levels of BMEP.

These and other objectives can be achieved, in the case of a multi-cylinder engine, by employing a premixed-charge combustion system which utilizes the two-layer type of barrel stratification as well as, in a specifically preferred embodiment, four poppet valves arranged symmetrically with respect to the plane which separates the two barrel swirl layers. A first spark plug occupies an offset location positioned well into the always-fueled barrel swirl layer because this offset location is bounded by only the exhaust valve and only the intake valve on the fueled side of the engine cylinder. A second spark plug occupies a central location bounded by all four of the poppet valves, but the strong cycle-to-cycle variation in air-fuel ratio existing at this location prior to combustion in the fueled barrel swirl layer does not translate into strong cyclical variation of BMEP because combustion is initiated first by the offset spark plug. The central spark plug is fired only after expansion of combustion products from ignition at the offset spark plug has pushed the rich-side boundary of the zone of cycle-to-cycle variation in air-fuel ratio past the electrodes of the central spark plug. Consequently, the central spark plug can be consistently fired when its electrodes are enveloped by fresh mixture quite similar in air-fuel ratio to that which exists at the offset spark plug. In addition, the combustion system includes individual port type fuel injectors for fully barrel stratified charge engine operation and a central fuel metering system for homogeneous charge operation with essentially maximum charge cooling effect. In a preferred method of utilizing combined as well as separate fuel delivery from either the individual or the central fuel metering components, the engine operates unthrottled throughout a wide range of higher levels of BMEP.

BRIEF DESCRIPTION OF THE DRAWING

The present invention is illustrated in the accompanying four figures of the drawing, in which:

FIG. 4 represents the staggered spark timing schedules essential for proper operation of the invention as delineated in FIGS. 1, 2 and 3.

DESCRIPTION OF THE PREFERRED EMBODIMENTS

Figure 1:
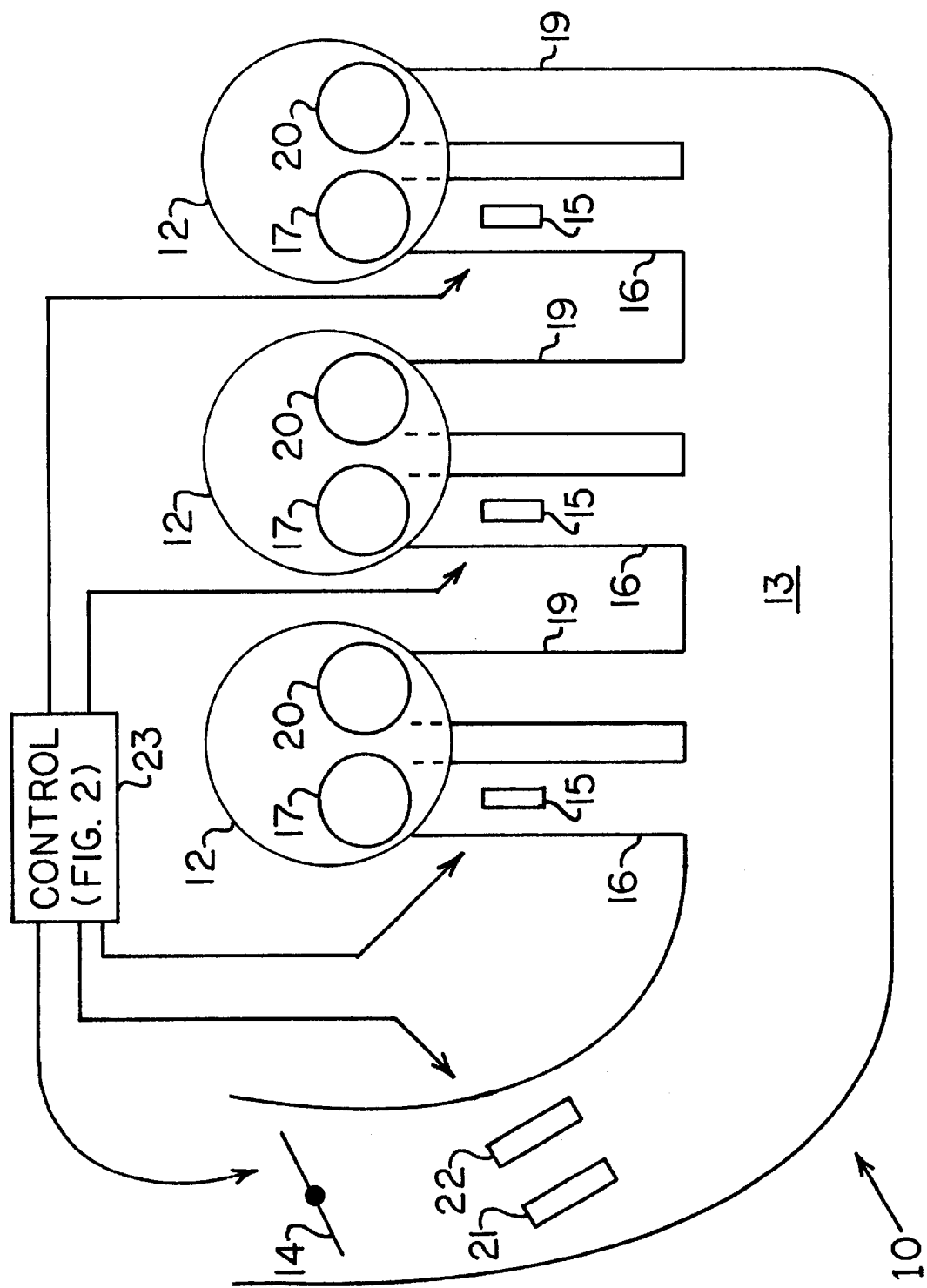
FIG. 1 is a schematic representation of a three-cylinder inline engine which utilizes induction system features prescribed by the present invention.

FIG. 1 presents a schematic showing novel features that would be incorporated in an inline configuration spark-ignition engine 10 embodying the present invention. This example barrel-stratified-charge engine 10 has only three of the cylinder 12, but many other engine configurations could just as easily embody the present invention. For instance, a second cylinder bank composed of three more of the cylinder configuration 12 and served by a duplicate of the combustion air plenum 13 could be attached to the crankshaft (not explicitly shown) of the engine 10 to thus form a vee-six cylinder arrangement. Since the plenum 13 does incorporate a throttle valve 14, such an approach would require connecting the resulting two throttles 14 together to always move in unison to thereby supply a common intake charge pressure to all six cylinders. However, using a single throttle valve to serve the plenums of both cylinder banks would be simpler and more effective for a vee configuration engine.

The fifth drawing figure of U.S. Pat. No. 5,553,580 explicitly illustrates how a single throttle valve can provide the same intake charge pressure to two plenum chambers, but in this case, each plenum serves the same group of three cylinders. More importantly, this U.S. Pat. No. 5,553,580 also discloses the physical configuration for a three-valve, high squish area combustion chamber which may advantageously be utilized in each cylinder 12 of the engine 10 for the requisite stratified charge operation according to FIG. 2, and the disclosure of this '580 patent is therefore incorporated herein by reference. While this incorporated disclosure does present a complete combustion system for barrel-stratified engine operation, only the actual combustion chamber configuration and barrel-swirl generating orientation of intake passages are utilized in the combustion system now to be described for the present invention.

With one preferred type of barrel-swirl combustion chamber now specified for each cylinder 12 of the engine 10, FIG. 1 reveals that an individual "port" type of electromagnetically actuated gasoline fuel injector 15 is disposed in the primary intake passage 16 serving the first poppet type of intake valve 17 of each of the three cylinders 12. In contrast, there is no means for delivering fuel into the flow of combustion air provided by the plenum 13 after the flow has been distributed among the individual secondary intake passages 19 and before it is admitted to the cylinders 12 through the second intake valve 20 in each of the three cylinders 12. Instead, fuel may be metered into the plenum 13 by the two central gasoline fuel injectors 21 and 22; separate reference numerals for the injectors 21 and 22 signify that they are not necessarily identical. (The terminology, "intake passage," is used herein to avoid difficulty created by the fact that the entire length of an intake passage as contained within an engine cylinder head casting is often described as being an intake port, while a portion of the same passage further upstream may be called an intake runner. In other words, the terminology, "intake passage," as used herein denotes the entire length of an intake airflow passage which serves only one cylinder of a multicylinder engine, regardless of which castings or other parts of the engine contain the passage. Moreover, the individual intake passages 16 and 19 deliver combustion air from the plenum 13 to the cylinders 12, which is to say that the term, "plenum," as used herein is not synonymous with the term, "intake manifold" as commonly used (but not used herein), because the plenum 13 does not include any of the individual passages 16 and 19.)

In summary of what is effectively the combination of a port fuel injection system with a central fuel metering system, the three individual fuel injectors 15 can by themselves fuel the engine 10, but only in a fully stratified charge mode of engine operation used in a range of relatively low BMEP (brake mean effective pressure). On the other hand, homogeneous charge operation results from fueling the engine 10 only via the central fuel metering system which includes the injectors 21 and 22, but this other mode of engine operation is closely approximated only at high BMEP. Components shared by the port and central fuel metering systems, such as a mass air flow sensor, electronic control system for the throttle 14 and digital electronic memory, are represented in FIG. 1 by the master control system 23 which implements the schedules 25, 26 and 27 shown in FIG. 2. These include the schedule 25 for the basic (that is, without acceleration enrichment, etc.) time width of voltage pulses for actuating the injectors 15, the schedule 26 for the basic pulse width applied to the central fuel injectors 21 and 22, and the schedule 27 for the position of the throttle valve 14. Although these schedules 25, 26 and 27 apply to the same representative, fixed value of crankshaft RPM of the engine 10, the following features do characterize essentially the entire operating speed range of the engine 10.

First, the throttle position curve 27 verifies that fully barrel-stratified operation of the engine 10, that is, engine operation defined by fueling of air admitted to the three cylinders 12 only through the first intake valves 17, as confirmed by the zero pulse width portion of schedule 26, always accompanies engine operation with the throttle valve 14 less than effectively wide open. The particular position of the throttle 14 which marks the transition 28 from less than, to at least equal to, effectively wide open throttle will of course be a function of the crankshaft RPM of the engine 10. Since the secondary intake passages 19 and their associated second intake valves 20 are designed to duplicate the gas flow performance of the primary intake passages 16 and their associated first intake valves 17, this throttled engine operation to the left of the dashed transition line 28 in FIG. 2 has an overall air-fuel ratio slightly more than twice the combustion-cycle averaged stoichiometric ratio preferred for the air-fuel mixture concurrently being admitted to the cylinders 12 through only their first intake valves 17. Displacement of air in the primary intake passages 16 by vaporization of gasoline injected against the back surface of each of the first intake valves 17 while they are closed accounts for greater mass airflow through the secondary intake passages 19, and thus for an overall air-fuel ratio somewhat greater than double the stoichiometric value.

During engine operation at any representative fixed RPM value on the transition 28, brake specific efficiency of the engine 10 will benefit from an effectively unthrottled flow of intake air and from a stratified charge having an overall air-fuel ratio in excess of thirty to one. Since operation of the engine 10 at 100 percent BMEP also benefits from an unthrottled flow of intake air, the advantage of lean, stratified combustion during operation on the transition 28 probably would not outweigh the fact that engine friction is not substantially reduced when indicated mean effective pressure is in rough approximation cut nearly in half by in effect omitting fuel from the righthand half of the stoichiometric air-fuel charge fully occupying each of the cylinders 12. These considerations for comparing BMEP at the transition 28 to the 100 percent BMEP level are reflected in FIG. 2 by an expected BMEP value of slightly less than 50 percent for the transition 28. If enrichment past stoichiometric is employed at the maximum BMEP for the fixed RPM value of FIG. 2, then the expected transition value of BMEP would be less than the 48 percent of maximum as indicated in FIG. 2.

Figure 2:
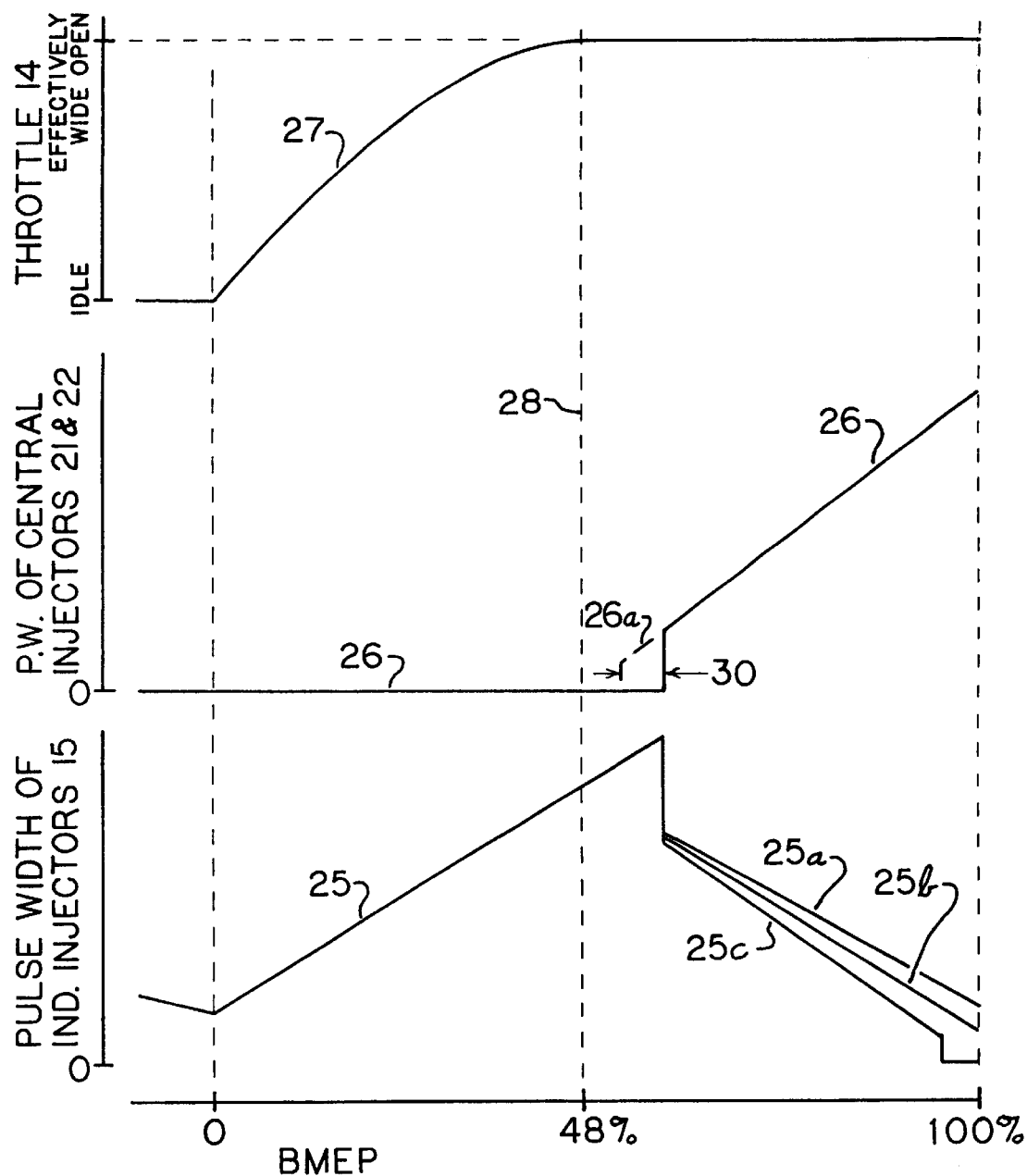
FIG. 2 is a graphic representation of various operating schedules implemented by the control system 23 of FIG. 1 in accordance with the present invention.

Of fundamental importance in FIG. 2 is the upward slope of both the pulse width schedule 25 and the throttle position curve 27 essentially throughout the range of relatively low BMEP extending up to 48 percent of the maximum BMEP for the example RPM value represented. In view of this fixed engine speed, the common intake charge pressure provided to each of the six identically sized intake valves of the engine 10 increases as the throttle 14 is progressively opened in the BMEP range to the left of the transition 28. In order to maintain the preferred stoichiometric air-fuel ratio of mixture admitted through only the first intake valves 17, the pulse width 25 must increase throughout this BMEP range and is in fact directly responsible for the rising BMEP. Even if the preferred stoichiometric composition of the mixture in the lefthand barrel-swirl layer of each of the cylinders 12 were not maintained, the pulse width 25 must still increase to provide greater engine torque output as the throttle 14 is opened because the pulse width 26 for the central fuel injectors 21 and 22 remains at zero.

On the righthand side of the transition 28 in FIG. 2, however, the central fuel injectors 21 and 22 become active so that an increasing portion of the total fuel delivery rate to the engine 10 will be vaporized by absorbing heat energy from the intake air flowing through the plenum 13, rather than from the surface of the back of the three intake valves 17. The consequent cooling of the engine intake air increases its density and thus the volumetric efficiency of the engine 10. This effect also contributes to the expected BMEP at the transition 28 being slightly less than 50 percent of the maximum BMEP for the engine speed represented in FIG. 2.

So in the (unthrottled) range of relatively high BMEP to the right of the transition 28 in FIG. 2, brake torque output of the engine 10 is increased or decreased by increasing or decreasing, respectively, the rate at which fuel is being delivered by the central fuel injectors 21 and 22 to be later distributed among the secondary intake passages 19. To maintain the preferred stoichiometric composition of the mixture supplied by the primary intake passages 16 in this range of effectively wide open throttle engine operation, the individual fuel injectors 15 must compensate for fuel now being added to the flow of intake air upstream of the primary passages 16. As a result, the preferred overall operating strategy for the barrel-stratified engine 10 absolutely requires that the slope of the pulse width schedules 25a, 25b and 25c for the individual injectors 15 be opposite the positive slope of the pulse width schedule 26 in this unthrottled range, and therefore also opposite the direction of BMEP change in this range of engine operation. At the same time, this transfer of fuel delivery rate from the port injection system to the central fuel injection system has the fortuitous effect of essentially maximizing volumetric efficiency of the engine 10 at precisely the right time, that is, on the schedule of maximum BMEP versus crankshaft speed (not shown). Lower temperature of the air-fuel mixture filling the cylinders 12 also permits a higher engine compression ratio to be utilized for operation on fuel of a given octane level.

The pulse width schedule 26 for central fuel metering displays a discontinuous jump up from zero because the fuel injectors 21 and 22 cannot meter fuel with acceptable accuracy at less than a minimum amount of fuel per individual cycle, and these electrically energized cycles are synchronized with the combustion cycles of the engine 10 just as are the energizing voltage cycles of the port injectors 15. The resulting jump up from zero pulse width includes an extra increment in magnitude for establishing a BMEP null band 30 which guards against excessive switching back and forth between partially wet and completely dry operation of the plenum 13. Consequently, the short dashed portion 26a of schedule 26 is effective during decrease of engine BMEP and reveals the true magnitude of the minimum acceptable pulse width.

Moving now to a more detailed consideration of the individual port fuel injectors 15, the null band effect is not explicitly shown on the schedule 25 in order to emphasize that these injectors 15 adopt the slightly different pulse width subschedules 25a, 25b and 25c when the central fuel injection system is active. The objective served by this feature is that the individual injectors 15 help correct cylinder-to-cylinder error in air-fuel ratio caused by adhesion of liquid gasoline to the interior surfaces of the plenum 13. Thus, one or two of the injectors 15 may continue to meter fuel at a low rate when the engine 10 operates at 100 percent of the BMEP available for the existing engine speed. The cylinder specific pulse width schedule portions 25a, 25b and 25c may of course exhibit a different relationship to each other as engine speed varies, and they need not be linear functions of BMEP. While minimum practical pulse width is a consideration in specifying the 100 percent BMEP values of the subschedules 25a, 25b and 25c, any pulse width accuracy level which would reduce average cylinder-to-cylinder error in air-fuel ratio is an acceptable level. Subschedule 25c does illustrate abrupt termination of the last practical increment in pulse width for an individual one of the port injectors 15, but the corresponding increment of added pulse width is not shown on the schedule 26.

Since the barrel-stratified engine 10 that has now been described with reference to FIGS. 1 and 2 is a leanburn engine, it does not employ exhaust gas recirculation (EGR). If, on the other hand, conventional three-way catalysis with EGR is to be combined with the basic approach of FIGS. 1 and 2, then air flowing through the three secondary intake passages 19 in excess of what is required for combustion of fuel metered into only that secondary air must be replaced by recirculated exhaust gas; no exhaust gas would be recirculated to the primary intake passages 16. This approach can be implemented by recirculating exhaust gas only into a second intake plenum added for feeding combustion air to the secondary passages 19 separately from the primary intake passages 16, but still with a common throttle serving both plenums as shown in the fifth drawing figure of U.S. Pat. No. 5,553,580. The leanburn engine 10 offers significant simplification in comparison to such a dual-plenum arrangement with EGR, both with respect to the engine air induction system and with respect to the required control system.

The foregoing strategy of progressively transferring fuel metering from individual port type injectors to a central fuel injection system can still be applied to nominally homogeneous charge engines, including many with just one intake valve per cylinder. Nevertheless, the embodiment of FIGS. 1 and 2 accommodates this strategy especially well. Most evident in this regard is the fact that the central fuel injectors 21 and 22 do not meter fuel into the plenum 13 unless the throttle valve 14 is at least effectively wide open. As a result, this restricted regime for central fuel metering will cause relatively little wetting with gasoline of the interior surfaces of the plenum 13. This advantage becomes more evident when comparison is made to the "throttle body" type of central fuel injection previously used widely in production passenger cars; these throttle body systems meter all fuel centrally throughout the entire range of part-throttle engine operation, including the extremely low air flow condition of engine idle.

Since the central fuel injectors 21 and 22 do meter fuel only during unthrottled operation of the engine 10, the time required for transport of fuel aerosol from the vicinity of the injectors 21 and 22 to the cylinders 12 is comparatively brief, even at low RPM of the engine 10. Such more rapid transport of the fuel aerosol will in turn enhance the effectiveness of designing the central injectors 21 and 22 to provide a smaller average droplet size, for example, as could be achieved by using a small source of compressed air (not shown) to assist fuel atomization by the injectors 21 and 22. Alternatively stated, even a relatively high quality fuel aerosol would exhibit significantly greater settling out of fuel droplets onto lower, interior surfaces of the plenum 13 if the transport time were unnecessarily long. In addition, the injectors 21 and 22 are located downstream of the throttle valve 14 in order to avoid fuel aerosol impaction losses on the throttle 14 when it is less than fully open in spite of being effectively wide open. (If a small source of compressed air is made available for assisting fuel atomization by the central injectors 21 and 22, it could also be utilized during cold starting of the engine 10 to transform operation of the individual injectors 15 from a normal intake-valve targeting type of operation into an aerosol generating mode of operation.)

Another instance of synergism between barrel stratification and progressive transfer of fuel metering from individual to central fuel injectors relates to transient operation of the engine 10. In summary of enhanced transient operation, a brief excursion to richer than stoichiometric air-fuel ratios for mixture delivered only through the primary intake passages 16 does not necessarily entail richer than, or even as rich as, stoichiometric overall air-fuel ratios for the cylinders 12. For example, during a quick change from the 100 percent BMEP level in FIG. 2 back to the 48 percent BMEP level of the transition 28, the central injectors 21 and 22 would be abruptly shut off, but fuel evaporating from wet interior surfaces of the plenum 13, of the primary intake passages 16 and of the secondary intake passages 19 would cause a transient overfueling condition if the pulse width of the individual injectors 15 were just as abruptly increased to the high steady-state magnitude shown by the schedule 25 at the transition 28. If, instead, the pulse width for the injectors 15 is increased more gradually, then moderate overfueling (past stoichiometric) of only the mixture being delivered by the primary intake passages 16 can be used to preclude the possibility of any lean misfires while at the same time avoiding any combustion cycles richer than stoichiometric for the entire contents of the cylinder 12. More specifically, air delivered to the cylinders 12 through only the secondary intake passages 19 during this transient condition will contain some fuel, and also some excess air due to the fact that the fuel comes mainly from drying of wetted interior surfaces of the engine induction system. The excess air in turn makes a relatively generous range of overfueling available concurrently for the primary intake passages 16 without exceeding a stoichiomeric overall air-fuel ratio for any individual combustion cycle. Furthermore, mixture flowing through the primary intake passages 16 can be somewhat leaner than stoichiometric without danger of misfire, and retarded ignition spark timing can be utilized to trim the energy produced by transient combustion cycles which are overfueled from the standpoint of the new, target engine torque output.

Figure 3:
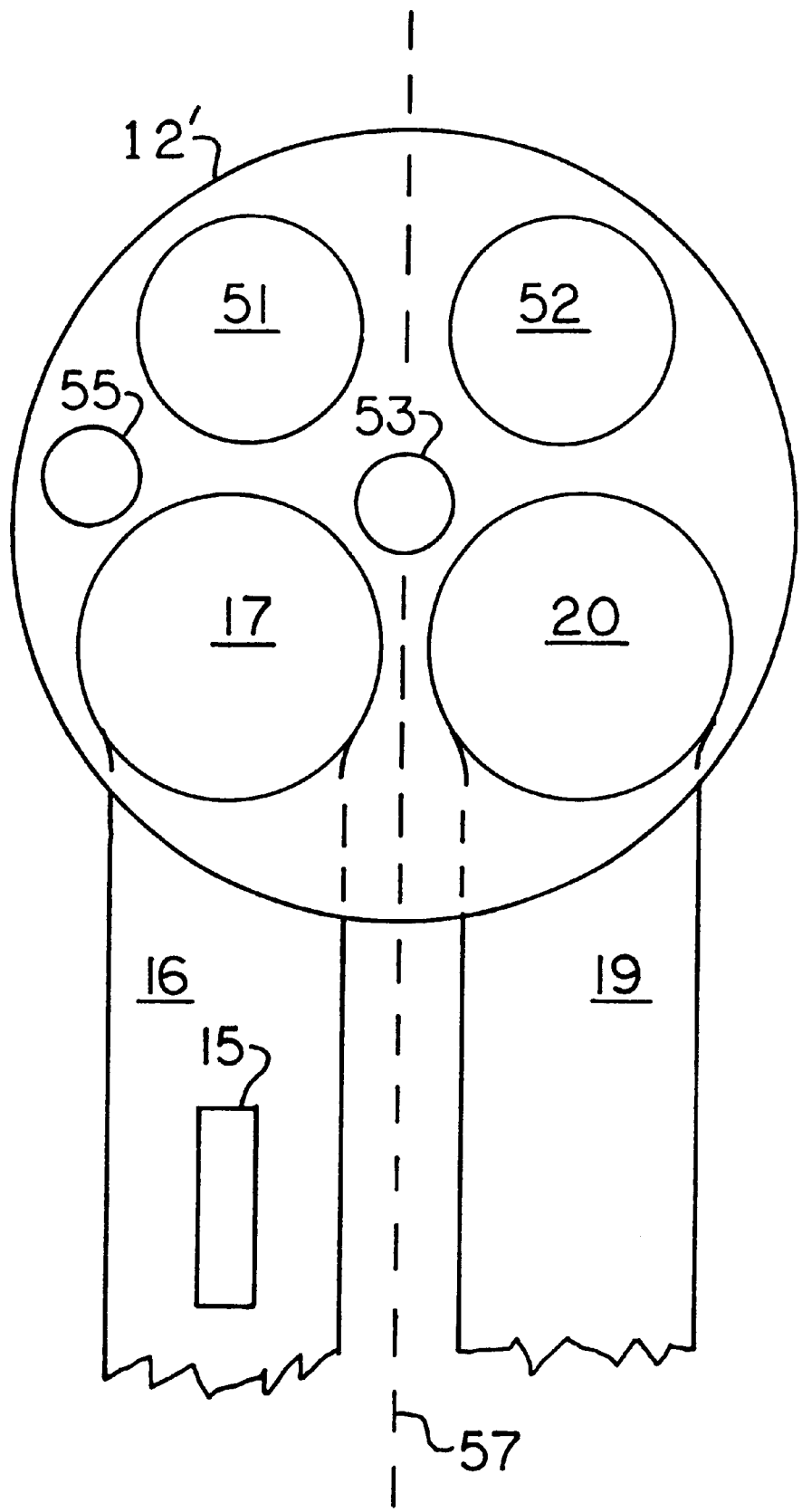
FIG. 3 shows a schematic of a novel combustion chamber configuration which may be advantageously combined with the other novel engine features portrayed in FIG. 1 and in FIG. 2.

Moving now to FIG. 3, the disk-shaped combustion chamber included in the cylinder 12 prime confirms that the cylinder 12 in FIG. 1 can have alternatives to the combustion chamber disclosed in the incorporated U.S. Pat. No. 5,553,580. The prime added to the reference numeral 12 in FIG. 3 signifies this alternative in combustion chamber shape as well as the adoption of the two exhaust valves 51 and 52, but the two intake valves 17 & 20 with their associated tumble-inducing intake passages 16 & 19, and with their associated valve stem orientation parallel to the geometric cylinder axis, are retained as previously specified for FIG. 1 via incorporation of the disclosure of U.S. Pat. No. 5,553,580 (but with different reference numerals than used in patent '580). Another major departure from the disclosure of U.S. Pat. No. 5,553,580 is a second spark plug 53 positioned in a generally central location for augmenting the first spark plug 55 positioned in an offset location more characteristic of the basic two-layer type of barrel stratification utilized by the present invention.

During fully stratified operation of the engine 10 according to the portion of FIG. 2 to the left of the transition 28 and also with the cylinder configuration 12 prime of FIG. 3 replacing the configuration disclosed in U.S. Pat. No. 5,553,580, a plane 57 passing through the geometric axis of the cylinder 12 prime will delineate separation of gases filling the cylinder 12 prime individually through the intake valves 17 and 20 as described in SAE papers 920670 and 940986. As further explained in these two SAE technical papers authored by Mitsubishi engineers, this inherent boundary of charge separation in the cylinder 12 prime will persist late into the compression stroke because flow velocity components arising in directions parallel to the drawing plane of FIG. 3 will still be symmetric about the plane 57. Since this plane of symmetry 57 is also the boundary of the charge stratification induced in the two-layer type of barrel stratification as employed by the present invention, the central spark plug 53 will often lie in a zone of sharp transition of air-fuel ratio. For this reason, the first spark plug 55 will deliver an ignition spark prior to the central plug 53 under many engine operating conditions.

In more detail of staggered spark timing for the spark plugs 53 and 55, a generous estimate of the separation interval in spark timing needed for combustion initiated by the first spark plug 55 to push the air-fuel ratio transition zone sufficiently beyond the electrodes of the second plug 53 can be based on typical ignition delay times and on the particular operating conditions of the engine 10. Then without varying the magnitude of this estimate of the separation interval required to assure location of the second spark plug 53 safely within readily ignitable air-fuel mixture, dynamometer testing will reveal optimum (minimum for best torque, or MBT) spark advance values for the estimated separation interval; this testing should be carried out using fuel with significantly higher octane than intended for normal operation of the engine 10. At this initial value of MBT spark timing for the second (central) spark plug 53, the spark separation interval can now be refined by varying only the timing of the ignition spark delivered by the first (offset) plug 55, still using high octane fuel. The coefficient of variation of indicated mean effective pressure should be taken into consideration during this part of the testing. And last, fuel of the intended octane level and the new, empirically determined spark separation interval (held constant) are used to finalize the two spark timing values. This overall procedure can of course be applied to a representative grid of engine operating points for the engine 10, with results from earlier dynamometer testing points being used to refine estimates for later points.

FIG. 4 presents general features expected for a representative constant crankshaft speed of the engine 10 as obtained using the foregoing or a similar procedure for determining spark timing maps. To begin, the spark timing schedule 60 for the central spark plug 53 displays significantly less advance as BMEP increases via greater opening of the engine throttle 14, but the schedule 60 remains more nearly constant as BMEP increases further in the unthrottled range of engine operation to the right of the transition 28. More moderate change in the spark schedule 60 is expected in the unthrottled BMEP range because neither the absolute pressure nor the stoichiometric air-fuel ratio of the mixture of the fueled portion of the uncompressed air-fuel charge (on the lefthand side of plane 57 in FIG. 3) changes significantly in the unthrottled range. The other spark schedule 61, for the offset spark plug 55, leads the schedule 60 by an interval which decreases as turbulence increases with progressive opening of the throttle 14. In the unthrottled range, this schedule 61 dips downward in order to curtail combustion noise, rather than as a consideration of providing absolute maximum engine brake torque. With this same objective, firing of the offset spark plug 55 is terminated entirely at the point 63 where the cylinder 12 prime begins to function essentially as a homogeneous-charge engine cylinder in which a single, centrally located spark plug provides a sufficiently high rate of rise of combustion pressure at and near maximum BMEP.

As just implied, the intake passages 16 and 19 would preferably generate tumbling motion of the charge in the cylinder 12 prime with sufficient strength that the rate of combustion pressure rise in the cylinder 12 prime would often be unacceptably high if both of the spark plugs 53 and 55 were aggressivlely used to initiate combustion during engine operation at and near maximum BMEP. While keeping the throttle 14 at least effectively wide open will in fact maintain tumble strength at its maximum value for any given RPM, the rate of combustion pressure rise in the cylinder 12 prime would still experience some diminution as BMEP is decreased from maximum by reducing the amount of fuel contained in the portion of the air-fuel charge on the righthand side of the plane 57. The downward trend in the schedule 61, and its termination at the point 63, will counteract this diminution in rate of pressure rise by trimming the rate as otherwise generated (for example, by the dashed schedule 61 prime) at the highest levels of BMEP.

Not only that, but the alternative of maintaining operation of the offset spark plug 55 with early spark timing, as exemplified by the dashed curve portion 61 prime, can be utilized only at lower RPM to counteract the deficiency that basically conventional four-valve combustion chamber design cannot easily accommodate both adequate tumble strength at low engine RPM and good air flow performance at relatively high RPM. (A completely conventional pentroof shape is of course an alternative to the disk shaped combustion chamber already specified for the cylinder 12 prime.) A "tumble control valve" arrangement would enhance tumble at low RPM, especially during part-throttle operation to the left of the transition 28, but not without increasing engine cost and complexity. Low-RPM operation illustrated by the dashed curve portion 61 prime should secure a significant part of the overall benefit offered by a tumble control valve, and unthrottled engine operation throughout the relatively high BMEP range on the righthand side of the transition 28 in FIGS. 2 and 4 already makes a tumble control valve arrangement of relatively limited value in this very important range of engine operation.

A revised spark timing strategy addresses the greater susceptibility to autoignition at lower engine RPM by retaining the basic dropoff exhibited at higher BMEP by the spark timing schedule 61, but the schedule 60 for the central spark plug 53 would also exhibit this general characteristic. In more detail, the air-fuel ratio of the barrel swirl layer filling the righthand side of the cylinder 12 prime would not become richer than about 23 to one until the overall air-fuel ratio for both barrel swirl layers dropped to 18 to one, and the excess air at 23 to one and leaner would be very effective in allowing MBT spark advance to be used at low RPM without autoignition. On the other side of the cylinder 12 prime, early ignition at the offset spark plug 55 will guard against autoignition in that half of the combustion chamber by burning mixture in the endgas location first, so that an elevated engine compression ratio can be utilized if knock limited spark advance is adopted, but only for the high BMEP levels produced above an overall air-fuel ratio of about 18 to one. These BMEP levels would be used only during rapid acceleration of a passenger car powered by the engine 10, and, in fact, the combination of low RPM and high BMEP would be restricted to acceleration in first gear because gearshifts are executed at high RPM during rapid acceleration. In this way, applying knock limited spark advance to an extremely limited area of engine operation will allow a higher engine compression ratio than would otherwise be acceptable.

If all four of the valve stems for the cylinder 12 prime of FIG. 3 are to be parallel to the cylinder axis, then a flat-top piston configuration will obviously yield a disc-shaped combustion chamber. In addition to the advantages of simplicity and light weight, a flat piston crown surface will ensure that horizontal rotational momentum imparted symmetrically to air filling the cylinder 12 prime as the air reaches the curved cylinder wall after traveling horizontally across the top of the lowered piston will dominate the opposing horizontal momentum imparted at the top of the cylinder 12 prime. This is true because air striking the curved cylinder wall after passing through the intake passages 16 and 19 will already have a downward velocity component when it strikes the curved wall on the side of the cylinder 12 prime opposite the intake valves 17 and 20.

As a consequence of the rotational momentum directions favored by a flat piston crown surface, the entire bulk flow of barrel swirl will break apart at the bottom as the piston moves upward on the compression stroke, and the resulting two symmetric vortices will remain attached to each other at the top as their rotational axes shift toward vertical positions, as shown in FIG. 14(b) of SAE paper 940986. Therefore, the remaining tilt of the vortices from vertical will leave more quiescent conditions at the offset spark plug 55 when it is fired; this in turn helps ensure that the lefthand one of the vortices will not transfer combustion products to the vicinity of the central plug 53 before it is fired. Any use of a "tumble control piston" configuration, as described in SAE paper 940986, is thus to be avoided in the case of the present invention because it might cause the original bulk flow to break apart at the top.

If the stems of the valves 17, 20, 51 and 52 are splayed outward to form a pentroof combustion chamber, a ramp combustion chamber, or even a radial-valve combustion chamber, then there might be a requirement for a dome on the top surface of the associated piston, depending on considerations such as valve-stem included angle, compression ratio and bore to stroke ratio. If a dome is used, it should be shaped to preserve the dominant contribution to horizontal momentum generated by air flow across the piston as it strikes the curved cylinder wall.

The foregoing embodiments of the present invention represent the best modes presently contemplated by the inventor for practicing his invention, and as such, these embodiments are specific illustrative examples not intended to limit the spirit and scope of the appended claims. Nevertheless, just a few examples of variations of the present invention will now be mentioned both because they help illustrate the scope and breadth of the following claims and because, for certain uses, they might later prove to be at least as beneficial as the particular embodiments that have already been described in some detail.

First, supercharging is an option which is generally more viable when the cost constraints of manufacturing an engine are not as strict as they often are in the case of passenger cars. For instance, supercharging could be employed on spark-ignition engines according to the present invention as designed to have fuel economy competitive with that of diesel engines, but still with significantly lower manufacturing costs as well as reduced weight, operating noise, exhaust odor and particulate emissions. Such engines, for example, power recreational watercraft, medium duty trucks, agricultural & construction equipment and electric generators. The incorporated disclosure of U.S. Pat. No. 5,553,580 considers supercharging in more detail.

Next, the intake valves 17 and 20 of the cylinder 12 prime could be somewhat reduced in face diameter to thus provide space for moving the center spark plug 53 to a lower position in FIG. 3, which would in turn accommodate replacing the two exhaust valves 51 and 52 with a single, large exhaust valve bisected by the plane of symmetry 57. Moreover, the original, relatively large intake valve size can be preserved in the case of using a single, large exhaust valve if the spark plug 53 is moved to a location still on the plane of symmetry 57, but below rather than above a line through the valve-face centers of the intake valves 17 and 20.

As the last example which helps illustrate the breadth and scope of the following claims, each cylinder of a multi-cylinder engine would have just a single intake valve and a single exhaust valve, both aligned on a common diameter of the cylinder. A thin central wall extending into the flow of intake air from the intake valve stem would divide into two symmetric intake passages what would otherwise be a single intake passage feeding the single intake valve, and this divider would be centered on an extension of the cylinder diameter on which the valve face centers are aligned. A port fuel injector would deliver fuel to only one side of the intake passage divider of each cylinder, and a single spark plug would be located in each cylinder relatively close to both of the valves but still offset well into the port-injected half of the cylinder due to the valves being amply sized to thus require essentially all of the cylinder diameter. As before, the intake passages would generate relatively strong tumble in each engine cylinder, and all intake passages would communicate with a common plenum served by at least one central fuel injector. This overall arrangement could be operated according to FIG. 2 even though some port-injected fuel would transfer to the leaner side of the intake valve and intake passage divider. Compensation for this transfer of fuel could be achieved in the form of port injection of a somewhat richer than stoichiometric amount of fuel as based on the amount of combustion air supplied by the respective side of the divided intake passage.

Finally, a difficulty often encountered in drafting patent claims relates to the functional definitions already accepted within the relevant area of technology, versus new definitions which would make claim drafting more convenient, and indeed, much more effective. For instance, the terminology, "four-stroke internal-combustion engine," has a generally accepted, but probably somewhat imprecise, definition which encompasses a wide range of extremely diverse structural configurations. Even if engines such as the Wankel rotary engine were excluded by narrowing this example terminology to "reciprocating four-stroke I.C. engine," it would still encompass such diverse hardware as poppet valves, sleeve valves, double acting pistons and unusual types of reciprocating motion mechanisms. What this example makes clear is that its accepted definition is in fact functional. Accordingly, the following claims make their own functional definitions where no suitably precise definition already exists. While it has been recognized that the detailed description of an invention can serve as a dictionary of definitions for the associated patent claims, incorporation of definitions directly into the claims seems preferable when this can be done expediently.

What is claimed is:

1. A combustion system for a four-stroke reciprocating internal combustion engine having at least one cylinder, comprising:

means for inducting air and fuel into said one cylinder of the engine to thereby generate two-layer barrel stratification in said one cylinder, said stratification having a zone of sharp air-fuel ratio transition separating a relatively richly fueled barrel swirl layer in said one cylinder and a relatively lean or substantially unfueled barrel swirl layer in said one cylinder, a geometric plane passing through the geometric axis of said one cylinder being contained substantially within said air-fuel transition zone, a first ignition source positioned in the combustion chamber of said one cylinder in a location offset from said geometric plane into said relatively richly fueled barrel swirl layer of said one cylinder, a second ignition source positioned in the combustion chamber of said one cylinder in a location substantially on said geometric plane of said one cylinder, and ignition activation means effective, with combustion cycle to combustion cycle consistency during operation of said one cylinder with said barrel stratification, to (a) initiate combustion in said offset location of said one cylinder by activating said first ignition source and then (b) initiate combustion substantially on said geometric plane of said one cylinder by activating said second ignition source only after said activation of said first ignition source has initiated combustion to thereby create sufficient expansion to push said air-fuel transition zone past said location of second ignition source of said one cylinder, whereby during fully barrel stratified operation of the engine both of said first and said second ignition sources of said one cylinder consistently initiate combustion in relatively richly fueled mixture originally enveloping said first ignition source, but not said second ignition source.

2. The combustion system of claim 1 wherein said air-fuel induction means includes (a) means for fueling both of said barrel swirl layers of said one cylinder and for providing control of the air-fuel ratio in each of said two barrel swirl layers independently of the air-fuel ratio in the other of said two barrel swirl layers, and (b) torque control means operative to provide a common intake charge pressure to all cylinders of the engine and to regulate said common intake charge pressure, a method of operation of the engine implemented by said air-fuel induction means and by said torque control means comprising unthrottled operation of the engine whenever both of said two barrel swirl layers are fueled.

3. The combustion system of claim 2 wherein said fueling means comprises central fuel metering components and individual fuel metering components, said individual fuel metering components delivering substantially all fuel consumed by the engine during throttled operation and said central fuel metering components delivering at least 95 percent of the total fuel being consumed by the engine during operation at its maximum BMEP for the existing engine RPM level.

4. The combustion system of claim 1 wherein said air-fuel induction means includes (a) two intake passages for delivering combustion air to said one cylinder and (b) one poppet valve of a substantially common size at the entrance of each of said two intake passages into the combustion chamber of said one cylinder, a first of said two intake valves supplying substantially all combustion air for said relatively richly fueled barrel swirl layer and a second of said two intake valves supplying substantially all combustion air for said lean or unfueled barrel swirl layer.

5. The combustion system of claim 4 further comprising at least one poppet exhaust valve which serves said one cylinder, and wherein said offset location of said first ignition source is bounded by said first intake valve, by said exhaust valve and by a wall circumference of said one cylinder.

6. The combustion system of claim 5 further comprising a second poppet type exhaust valve to thereby render a symmetric four-valve configuration for said one cylinder.

7. The combustion system of claim 6 wherein said location of said second ignition source is bounded by each of said four poppet valves.

8. The combustion system of claim 7 wherein said air-fuel induction means includes (a) means for fueling both of said barrel swirl layers of said one cylinder and for providing control of the air-fuel ratio in each of said two barrel swirl layers independently of the air-fuel ratio in the other of said two barrel swirl layers, and (b) torque control means operative to provide a common intake charge pressure to all cylinders of the engine and to regulate said common intake charge pressure, a method of operation of the engine implemented by said air-fuel induction means and by said torque control means comprising unthrottled operation of the engine whenever both of said two barrel swirl layers are fueled.

9. The combustion system of claim 8 wherein said fueling means comprises central fuel metering components and individual fuel metering components, said individual fuel metering components delivering substantially all fuel consumed by the engine during throttled operation and said central fuel metering components delivering at least 95 percent of the total fuel being consumed by the engine during operation at its maximum BMEP for the existing engine RPM level.

10. A combustion system for every cylinder of a four-stroke reciprocating internal combustion engine, comprising:

two intake passages for supplying combustion air to the cylinder in two barrel swirl layers which are substantially symmetric about a plane passing through the geometric axis of the cylinder, one poppet valve of a substantially common size at the entrance of each of said two intake passages into a combustion chamber of the cylinder, a first of said two intake valves supplying substantially all combustion air for a first of said two barrel swirl layers and a second of said two intake valves supplying substantially all combustion air for a second of said two barrel swirl layers, a first spark ignition source positioned in said combustion chamber in an offset location bounded by said first intake valve, by a wall circumference of the cylinder and by a poppet type exhaust valve serving the cylinder, a second spark ignition source positioned in said combustion chamber in a location substantially on said plane of symmetry, an individual fuel injector device for delivering fuel only to combustion air supplied to said first barrel swirl layer of the cylinder, a central fuel metering system for delivering fuel to a flow of combustion air which is distributed among all of said first and said second intake passages serving the engine, said central fuel metering system being relied upon exclusively to provide fuel for combustion air supplied through every one of said second intake valve, engine torque control means operative to provide a common intake charge pressure to all of said first and said second intake valves and to regulate said common intake charge pressure, and further operative to control said central fuel metering system and every one of said individual fuel injector; said torque control means instituting at least a first torque control method comprising (a) establishing a range of relatively low BMEP operation of the engine by metering fuel for the cylinder only through said individual fuel injector to thereby fuel said first barrel swirl layer and avoid fueling said second barrel swirl layer, while concurrently restricting said common intake charge pressure to a value less than the maximum for the existing operating speed of the engine, (b) establishing a range of relatively high BMEP operation of the engine by metering fuel for the cylinder through said individual fuel injector and also through said central fuel metering system to thereby fuel both of said two barrel swirl layers, but in unequal amounts and (c) establishing a maximum BMEP operating condition of the engine by providing said maximum value of said common intake charge pressure and concurrently metering at least 95 percent of the total rate at which fuel is being consumed by the engine through said central fuel metering system to thereby at least closely approach equal fueling of said two barrel swirl layers, and ignition activation means operative, at least in said range of relatively low BMEP and with combustion cycle to combustion cycle consistency, to (a) initiate combustion in said offset location of said first spark ignition source by activating said first spark ignition source and then (b) initiate combustion substantially on said geometric plane of the cylinder by activating said second spark ignition source only after said activation of said first spark ignition source has initiated combustion to thereby create sufficient expansion to push a zone of sharp transition in air-fuel ratio separating said two barrel swirl layers past said second spark ignition source, whereby fully barrel stratified and significantly barrel stratified operation improve the operating efficiency of the engine throughout an expanded range of BMEP comprising said range of relatively low BMEP plus a significant portion of said range of relatively high BMEP, while engine operation at and close to said maximum BMEP condition benefits from a maximized or nearly maximized charge cooling effect.

11. The combustion system of claim 10 wherein said first control method further comprises providing said maximum value of said common intake charge pressure substantially throughout said range of relatively high BMEP engine operation, whereby engine throttling losses are reduced.

12. The combustion system of claim 10 wherein said combustion chamber of the cylinder includes a second poppet type exhaust valve to thereby render a symmetric four-valve configuration for the cylinder, said four-valve configuration being symmetric about said plane of symmetry for said two barrel swirl layers.

13. A method for controlling steady-state brake torque produced by a spark-ignition, internal combustion engine having (a) throttling apparatus operative to provide a common intake charge pressure to a group of at least two cylinders of the engine and operative to control the common intake charge pressure, (b) for each one of the group of engine cylinders, an individual fuel injector for delivering fuel to only the one cylinder, and (c) a central fuel metering system for delivering fuel to a flow of combustion air which is distributed among every one of the group of cylinders, the method comprising at each particular operating RPM of the engine within a wide RPM range:

increasing and decreasing the engine brake torque within a range of relatively low BMEP by increasing and decreasing, respectively, both of the common intake charge pressure and the average rate of fuel being metered through each of the individual fuel injectors while concurrently maintaining the central fuel metering system in an off state to meter substantially no fuel, said range of relatively low BMEP comprising at least twenty percent of the maximum positive BMEP range provided by the engine at said particular RPM, increasing the engine brake torque within a range of relatively high BMEP by (1) increasing the total average rate of fuel delivery by the central fuel metering system and (2) decreasing the average rate of fuel being metered through each of the individual fuel injectors, said range of relatively high BMEP comprising at least thirty percent of said maximum positive BMEP range provided by the engine at said particular RPM, and decreasing the engine brake torque within said range of relatively high BMEP by (1) decreasing the total average rate of fuel delivery by the central fuel metering system and (2) increasing the average rate of fuel being metered through each of the individual fuel injectors, whereby intake charge temperature and density are more completely enhanced at the highest levels of BMEP by transfer of fuel metering rate from the individual fuel injectors to the central fuel metering system.

14. The method of claim 13 wherein the control of engine brake torque within said range of relatively high BMEP further includes employing unequal average rates of fuel metering among the individual fuel injectors to thereby reduce cylinder-to-cylinder error in fuel delivery rate as provided by the central fuel metering system.

15. The method of claim 13 wherein each one of the group of engine cylinders has two and only two intake valves each of which is joined to a plenum by a separate intake passage, a separate one of the individual fuel injectors being employed to deliver fuel to only a first of said two intake passages serving each of the group of engine cylinders and the central fuel metering system being relied upon exclusively to supply fuel for combustion air delivered through the second of said two intake passages serving each of the group of cylinders, whereby only air is supplied through each of said second intake passages during operation of the engine in said range of relatively low BMEP.

16. The method of claim 15 wherein both of said two intake passages serving each one of said group of cylinders are joined to a common plenum.

17. The method of claim 14 wherein the control of engine brake torque within said range of relatively high BMEP further includes maintaining the throttling apparatus in at least an effectively wide open condition.

18. The method of claim 17 wherein the engine is a barrel stratified charge engine and wherein said relatively low and high BMEP ranges together comprise at least seventy percent of said maximum positive BMEP range provided by the engine at said particular RPM.

19. The method of claim 18 wherein the engine is a naturally aspirated engine and wherein said relatively low and high BMEP ranges together comprise at least ninety percent of said maximum positive BMEP range provided by the engine at said particular RPM.

* * * * *